US010566831B2

(12) United States Patent
McClung, Jr.

(10) Patent No.: US 10,566,831 B2
(45) Date of Patent: Feb. 18, 2020

(54) ZERO ENERGY LOSS EFFICIENT POWER SUPPLY RESPONSIVE TO CONNECTION STATE AND UTILIZATION DEVICE CONTROL

(71) Applicant: Oather A McClung, Jr., Santa Rosa, CA (US)

(72) Inventor: Oather A McClung, Jr., Santa Rosa, CA (US)

(*) Notice: Subject to any disclaimer, the term of this patent is extended or adjusted under 35 U.S.C. 154(b) by 115 days.

(21) Appl. No.: 15/905,663

(22) Filed: Feb. 26, 2018

(65) Prior Publication Data

US 2018/0254657 A1    Sep. 6, 2018

Related U.S. Application Data

(60) Provisional application No. 62/467,204, filed on Mar. 5, 2017.

(51) Int. Cl.
*H02J 7/04* (2006.01)
*G05B 15/02* (2006.01)
*H02J 7/00* (2006.01)
*H02M 7/00* (2006.01)

(52) U.S. Cl.
CPC ............ *H02J 7/04* (2013.01); *G05B 15/02* (2013.01); *H02J 7/0047* (2013.01); *H02M 7/00* (2013.01)

(58) Field of Classification Search
CPC ...................................................... H02J 7/044
See application file for complete search history.

(56) References Cited

U.S. PATENT DOCUMENTS

| 5,017,800 | A  | * | 5/1991 | Divan | H02J 9/062 |
| | | | | | 307/66 |
| 6,288,914 | B1 | * | 9/2001 | Sato | H02M 3/33523 |
| | | | | | 363/18 |
| 6,986,067 | B2 | | 1/2006 | Odaohhara et al. | |
| 7,332,834 | B2 | | 2/2008 | Lee | |
| 7,489,528 | B2 | * | 2/2009 | Tanaka | H02M 1/36 |
| | | | | | 363/21.01 |

(Continued)

FOREIGN PATENT DOCUMENTS

KR    20040088752 A  * 10/2004

OTHER PUBLICATIONS

English translation of KR20040088752A (Year: 2004).*

*Primary Examiner* — Charlie Y Peng

(57) ABSTRACT

In various embodiments, the energy efficient power supply utilizes switching control energy from an onboard energy storage device, or from an external utilization device power, to power the switching function of the power supply to switch between a zero energy use state, and an energized state, providing standby, low-draw, measured-demand, and full-output energy; variable, as the utilization device, or devices, require. Energized switching control is achieved by completing, or providing, the control circuit when the power supply is connected to a utilization device, or devices, or when the power supply is connected to a utilization device, or devices, and a utilization device signals, or when utilization devices signal, that power is needed from the power supply. De-energized switching control is achieved by disconnecting the power supply from a utilization device, or devices, or when a utilization device signals, or when utilization devices signal, that power is no longer needed from the power supply.

20 Claims, 9 Drawing Sheets

(56) References Cited

U.S. PATENT DOCUMENTS

| | | |
|---|---|---|
| 7,516,343 B2 | 4/2009 | Bhogal et al. |
| 7,698,585 B2 | 4/2010 | Malik et al. |
| 7,782,642 B2 | 8/2010 | Unger et al. |
| 7,831,851 B2 * | 11/2010 | Yoshii .................. H02M 3/156 323/317 |
| 7,910,833 B2 | 3/2011 | McGinley et al. |
| 7,910,834 B2 | 3/2011 | McGinley et al. |
| 7,923,869 B2 | 4/2011 | Bågenholm |
| 7,960,648 B2 | 6/2011 | McGinley et al. |
| 7,977,823 B2 | 7/2011 | DuBose et al. |
| 8,053,928 B2 | 11/2011 | Hsu et al. |
| 8,054,661 B2 | 11/2011 | Chen et al. |
| 8,164,932 B2 * | 4/2012 | Sims ...................... H02M 7/02 363/69 |
| 8,432,067 B2 | 4/2013 | Eikum |
| 8,653,789 B2 * | 2/2014 | Chen .................. H02J 7/0055 320/103 |
| 8,853,884 B2 * | 10/2014 | genannt Berghegger .................. H02J 9/005 307/125 |
| 10,050,459 B2 * | 8/2018 | Schwartz ............... H02J 9/005 |
| 2010/0041262 A1 | 2/2010 | Chesneau |
| 2010/0201208 A1 * | 8/2010 | Berghegger ........... H02J 9/005 307/125 |
| 2012/0299382 A1 * | 11/2012 | Lin ........................ H02J 9/062 307/66 |
| 2013/0027986 A1 * | 1/2013 | Atrash .............. H02M 3/33507 363/21.07 |
| 2013/0082533 A1 | 4/2013 | Hicks |
| 2015/0137770 A1 * | 5/2015 | Bencuya ............... H02J 7/0045 320/162 |

\* cited by examiner

ZERO ENERGY LOSS EFFICIENT POWER SUPPLY RESPONSIVE TO CONNECTION STATE AND UTILIZATION DEVICE CONTROL

PRIORITY

This application claims the benefit under 35 U.S.C. § 119(e) of U.S. Provisional Patent Application Ser. No. 62/467,204, entitled ZERO ENERGY LOSS EFFICIENT POWER SUPPLY RESPONSIVE TO CONNECTION STATE AND UTILIZATION DEVICE CONTROL, filed on Mar. 5, 2017, the entire disclosure of which is hereby expressly incorporated by reference herein.

FIELD OF THE INVENTION

The present invention generally relates to electrical power supplies having the ability to automatically switch to zero power consumption when not connected to utilization devices, or when utilization devices signal that they no longer need power from the power supplies, or both. The present invention is particularly useful in reducing electrical power consumption on a worldwide basis, thus greatly contributing in the efforts to eliminate and reverse global warming and atmospheric contamination.

BACKGROUND OF THE INVENTION

The present invention relates to a power supply device connected to a power supply source; the power supply device producing a different output voltage and/or type of power; said power supply device using zero power while in standby mode.

Most consumer electric and electronic utilization devices use power supplies to convert electricity from alternating current (AC) to direct current (DC). These utilization devices include, but are not limited to, mobile phones, smartphones, personal digital assistants, media players, cameras, personal computers, etc. It is estimated that the average home has at least 5 to 10 of these devices. This does not include office, commercial and industrial environments. Many of these power supplies provide power to portable electric/electronic utilization devices. These power supplies can be incredibly inefficient. Virtually all of these power supplies use power even when the utilization device is not in need of power, such as when the utilization device is in a fully charged or standby mode, or when the utilization device is disconnected from the power supply. The power supply continues to use power; wasting electrical energy while disconnected from the utilization device.

In the past, various systems and devices have been employed to limit the wasted energy when the utilization device is not in need of power or when the utilization device is disconnected from the power supply. Some of the above-described power supplies are now required by various state and federal government agencies to reduce wasted power to about 0.5 watts while in a standby or disconnected state. Recent advancements in the manufacture of these portables power supplies has reduced their standby power usage to 20-40 mA; the most common of these advanced power supplies are switched converters, which are more intricate and cooler than linear power supplies, but continually monitor load conditions in order to switch between low-dissipation, full-on and full-off states; still wasting energy while in a standby state.

In the past, power supply devices have incorporated timing devices to shut off the power supply after a predetermined time period. These devices are impractical, as they shut off sometimes even before the utilization device is fully charged. They are not designed to sense when the utilization device has been disconnected from the power supply; the power supply device continues operating, wasting energy. The timed power supply device may shut off before the utilization device is fully charged or, may shut off while the utilization device is still demanding power, causing the utilization device to shut down prematurely.

In the past, power supply devices have been constructed utilizing a line, or primary, voltage potential connection/control circuit located within the utilization device power cord, signaling the power supply device to shut off when the utilization device has been disconnected. Another of these types of configurations, wherein a signaling control circuit energized at line voltage potential and placed within the utilization device low voltage power cord, generally control a logic circuit that signals the power supply device to switch on when the utilization device is connected. In these afore-mentioned configurations, the connection/control and signaling control circuits generally produce a high frequency that may cause electromagnetic interference (EMI), also called radio-frequency interference (RFI), a disturbance that affects an electrical circuit, which can cause from error rates, to a total loss of data in the utilization devices they are meant to power. Also in these afore-mentioned configurations, as detailed, the connection/control and signaling control circuits are each at line, or primary, voltage potential. Placing a line, or primary, voltage conductor within a low-voltage power cord presents a life safety hazard that is unacceptable.

In the past, builders of very low wattage rated power supply devices that achieve very low standby power ratings in their devices have been allowed by certain standards bodies (IEC 62301, clause 4.5) to advertise devices as "no-load" while in standby mode type devices. The very nature of this allowance is a falsehood that undermines the goal of saving our environment from needless harm, and allows perpetuating a society of carelessness without conscience that would continue damaging our environment, instead of otherwise being regulated to produce power supply devices that are truly "no-load" while in standby mode.

Even with the above-mentioned regulations and advancements, it is very conservatively estimated that this wasted energy pollutes the atmosphere by over 450,000 metric tons of carbon dioxide put into the atmosphere yearly. Further conservative estimates of the wasted energy equates to; 162,000 tons of waste sent to our landfills yearly; or almost 51,000,000 gallons of gasoline wasted yearly; or 487,000,000 pounds of coal burned yearly; or the yearly total electrical use of 62,000 homes; all of it wasted. 656,000 gigawatts of power, per hour, is used by these devices while they are in standby mode, and all these numbers are growing at a rate of about 10% per year. Even the best currently produced power supply devices do not eliminate this waste. Clearly, presently manufactured power supply devices have limitations and improvements are needed over the forgoing.

SUMMARY OF THE INVENTION

The present invention intends to solve the above-described technical problems, and a primary object of the present invention is to save the power loss, or wasted power, of a power supply device and/or charger (PSD) when not connected to a utilization device (UD), or when a UD signals that it no longer needs power from the PSD, or both, by switching to zero power usage. In various embodiments, the present invention is capable of operating when connected to multiple UD's.

In various embodiments, the present invention includes a mains electrical input, which can be a plug capable of being plugged into an electrical outlet for receiving an AC power; a DC power converter/supply (PCS) connectable with the mains electrical input for converting the AC power into a DC power; a first control unit (FCU) which is connectable with a PCS DC power output; the FCU also connectable with an energy storage device (ESD); the FCU also connected with a second control unit (SCU); a control circuit; a power output circuit.

Alternately, the present invention may include a mains electrical input, which can be a plug capable of being plugged into an electrical outlet for receiving an AC power; a DC power converter/supply (PCS) connected with the mains electrical input for converting the AC power into a DC power; a control unit (CU) which is connected with a power supply from a utilization device (UD); a power output circuit; a control circuit.

To achieve the primary objective stated above, in one embodiment, the operation of the power supply device and/or charger (PSD) comprises the following steps: The PSD receives an AC power; the positive connection of an operating circuit component of a second control unit (SCU) electrically connects to an energy storage device (ESD) via a first control unit (FCU); next, electrically connecting the PSD with a utilization device (UD); the connection with the UD containing a control circuit which provides an electrical ground to the operating circuit ground of the SCU; when the positive connection of the operating circuit positive of the SCU is connected to the ESD, and when the connection with the UD containing a control circuit which provides an electrical ground to the operating circuit ground of the SCU is made, the control circuit of the SCU causes the SCU to electrically complete the AC circuit to the primary side of a power converter/supply (PCS), thus causing a DC electrical voltage to be present at the secondary side of the PCS; next, the said DC voltage circuit is conducted to the UD and to the FCU; the said DC voltage circuit includes a converted system electrical ground that is electrically connected to the control circuit of the SCU at the UD, thus providing the previously non-existent grounding circuit to the operating circuit of the SCU, either by the act of connecting the PSD to the UD, or by the UD being capable of independently closing the electrical connection between the converted system electrical ground and the control circuit of the SCU; in the case of a UD that is a "smart device", designed to work with the PSD which is the subject of this invention, the opening and/or closing of the converted system electrical ground and the control circuit of the SCU by the UD is possible; thus, the UD can control the electrical turning on and/or turning off of the AC circuit to the primary side of the PCS; hence, zero electrical power is utilized by the PSD when the PSD is disconnected from the UD, or in any case where the electrical circuit between the converted system electrical ground and the control circuit of the SCU is open, such as when the UD signals that it no longer needs electrical power from the PSD, by the UD opening the control circuit. The above-detailed steps generally do not necessarily have to follow any particular sequence. Once all the above-detailed steps are executed, the stated operation is achieved. For example: The positive electrical connection of the operating circuit of the SCU to the ESD may take place either before or after the PSD receives AC power; electrically connecting the PSD to a UD may take place either before or after the PSD receives the AC power, and either before or after the positive connection of the operating circuit of the SCU connects to the ESD.

In an alternate embodiment, the operation of the power supply device and/or charger (PSD) comprises the following steps: The PSD receives an AC power; a positive connection of an operating circuit component of a control unit (CU) electrically connects to a utilization device (UD) via a control circuit; then, a connection with a UD electrical ground to the operating circuit ground of the CU is made, the control circuit of the CU causes the CU to electrically complete the AC circuit to the primary side of a power converter/supply (PCS), thus causing a DC electrical voltage to be present at the secondary side of the PCS; next, the said DC voltage circuit is conducted to the UD; connecting the PSD to the UD causes the CU to operate by closing the primary circuit, causing the PCS to produce DC electrical voltage; or, with a UD being capable of independently opening and/or closing the control circuit between UD and the CU, as in the case of a UD that is a "smart device", designed to work with the PSD which is the subject of this invention, the opening and/or closing of the positive connection of the operating circuit between it and the CU is possible; thus, the UD can control the electrical turning on and/or turning off of the AC circuit to the primary side of the PCS; hence, zero electrical power is utilized by the PSD when the PSD is shut off by the UD opening the CU control circuit, or in any case where the positive connection of the operating circuit of the CU is open, such as when the CU is electrically disconnected from the UD, or when the UD signals that it no longer needs electrical power from the PSD. The above-detailed steps generally do not necessarily have to follow any particular sequence. Once the pertinent, above-detailed, steps are executed, the stated operation is achieved. For example: The positive electrical connection of the operating circuit of the CU to the UD may take place either before or after the PSD receives AC power; electrically connecting the PSD to the UD may take place either before or after the PSD receives the AC power.

While many advantages and features of the invention will be apparent from descriptions, drawings and claims, it should be understood that, in alternative embodiments, the components, devices, apparatus, and elements thereof may be somewhat different than those depicted and described herein. Although the exemplifications set out herein illustrate embodiments of the invention, and are intended to provide further explanation of the invention as claimed, the embodiments disclosed herein are not intended to be exhaustive or to be construed as limiting the scope of the invention to the precise forms disclosed. This invention is susceptible to considerable variation in its practice and is intended for a wide variety of applications. Therefore, any and all information disclosed herein is not intended to limit, and should not be construed as limiting the invention to the particular exemplifications presented herein.

In various embodiments, the invention may include; virtually any type available power converter/supply (PCS), as system operation is not dependent on the type of PCS utilized, but on system ability to switch on and off the primary power to the PCS. Various types of power supplies include, but are not limited to; linear type; unregulated type; linear regulated type; switching type; ripple-regulated type. Some of these PCS listed types can include logic circuits that cut back on charging once the UD is fully charged, or not using power, allowing for additional power savings in non-wasted power, such as with a switching power supply for low consumption. Some of these PCS listed types may include smoothing, filtering, and a myriad of other enhancing features. Some of these PCS listed types can include illumination device(s), viewable from outside the finished product, for alerting the user when the system is providing converted power.

In various embodiments, the invention may include; a power transformer/supply for transforming DC-to-DC rather than, or in conjunction with, the AC-to-DC converter discussed previously herein; such as when the primary power supply is at one DC voltage and a second DC voltage output from the transformer is desired, such as when a DC battery source at one voltage is available to power a utilization device at another voltage;

In various embodiments, the invention may include; a primary side pushbutton start switch, circuited across the contact points of a control unit of the invention, so that operating the pushbutton start switch closes the primary circuit, causing the power converter/supply, the power transformer/supply, and/or the power inverter/supply to produce power, such as in the case of a dead or un-charged system or utilization device energy storage device, where no system start power is available; the system is started by the pushbutton start switch.

In various embodiments, the invention may include; an onboard energy storage device charger, wired to charge the energy storage device when the system is in the "on" state.

In various embodiments, the invention may include; hard-wiring, and/or cord wiring of either the primary and/or secondary circuits and/or control circuits. For instance, the primary, input side of the invention may be by a cord connected plug that plugs into a supply source; the primary, input side of the invention may be by plug prongs, located on the device itself, for plugging into a supply source; the primary, input side of the invention may be by hard wiring to the supply source; the secondary, output side of the invention, and/or the control circuit(s), may be by a cord connected plug that plugs into a utilization device; the secondary, output side of the invention, and/or the control circuit(s), may be by plug prongs, located on the device itself, and/or located on the utilization device, for plugging the invention into a utilization device; the secondary, output side of the invention, and/or the control circuit(s), may be by hard wiring to the utilization device.

In various embodiments, the invention may include; the power circuit supplied to the utilization device containing any required control circuit(s), along with an unlimited number of other unrelated conductors, allowing for added functionalities. For example: a cord set connected between the invention and a utilization device may contain the power conductors, the control conductor(s), conductors that signal utilization state or other logic, such as in the multi-conductor connections of mini and micro USB sets that contain a myriad of function, logic control, annunciation, etc.

While the included drawings generally detail electro-mechanical type components for ease of understanding of the disclosed invention, it should be understood that in various embodiments, the elements of the circuitry of the invention may utilize electronic and/or electro-mechanical components, and may incorporate such technology as make-before-break and/or circuit holding components, however specific functionality may be desired in a finished product.

In various embodiments, the invention may include; an ability to connect to, or accommodate, a plurality of utilization devices.

BRIEF DESCRIPTION OF THE DRAWINGS

Various embodiments of the present invention are described herein by way of example in conjunction with the following figures, wherein.

Figure 1:
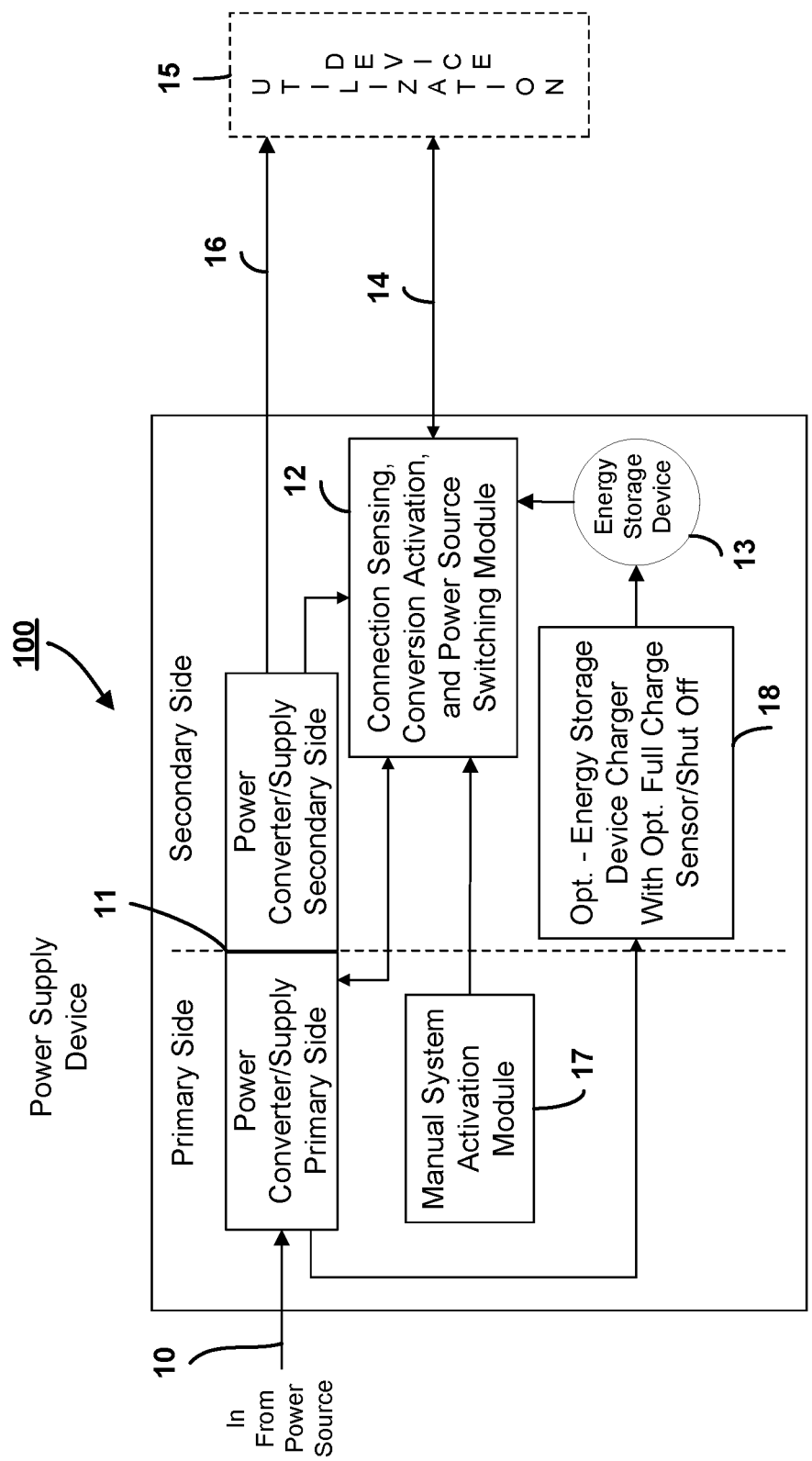
FIG. 1 is a schematic block diagram of a power supply device for powering and/or charging a utilization device in accordance with one embodiment of the present invention.

Corresponding reference characters indicate corresponding parts throughout the several views. Although the exemplifications set out herein illustrate embodiments of the invention, the embodiments disclosed below are not intended to be exhaustive or to be construed as limiting the scope of the invention to the precise forms disclosed.

DETAILED DESCRIPTION

While many advantages and features within this subject disclosure will be apparent from descriptions, drawings and claims, it should be understood that, in alternative embodiments, the components, devices, apparatus, and elements thereof may be somewhat different than those depicted and described herein. Although the exemplifications set out herein illustrate embodiments of the invention, and are intended to provide further explanation of the invention as claimed, the embodiments disclosed herein are not intended to be exhaustive or to be construed as limiting the scope of the invention to the precise forms disclosed. This invention is susceptible to considerable variation in its practice and is intended for a wide variety of applications. Therefore, any and all information disclosed herein is not intended to limit, and should not be construed as limiting the invention to the particular exemplifications presented herein. Certain abbreviations and acronyms are semi-consistently used throughout the descriptions and details; such as, PSD used for Power Supply Device and/or Charger; UD used for Utilization Device; PCS used for Power Converter/Supply; FCU used for First Control Unit; ESD used for Energy Storage Device; SCU used for Second Control Unit; CU used for Control Unit.

In generalized terms of an exemplar embodiment, the operation of the power supply device and/or charger (PSD) comprises the following steps: The PSD receives an AC power; a positive connection of an operating circuit component of a control unit (CU) electrically connects to a utilization device (UD) via a control circuit; a connection with a UD electrical ground to the operating circuit ground of the CU is made; the control circuit of the CU causes the CU to electrically complete the AC circuit to the primary side of a power converter/supply (PCS), thus causing a DC electrical voltage to be present at the secondary side of the PCS; next, the said DC voltage circuit is conducted to the UD; connecting the PSD to the UD causes the CU to operate by closing the primary circuit, causing the PCS to produce DC electrical voltage; or, with a UD being capable of independently opening and/or closing the control circuit between UD and the CU, as in the case of a UD that is a "smart device", designed to work with the PSD which is the subject of this invention, the opening and/or closing of the positive connection of the operating circuit between it and the CU is possible; thus, the UD can control the electrical turning on and/or turning off of the AC circuit to the primary side of the PCS; hence, zero electrical power is utilized by the PSD when the PSD is shut off by the UD opening the CU control circuit, or in any case where the positive connection of the operating circuit of the CU is open, such as when the CU is electrically disconnected from the UD, or when the UD signals that it no longer needs electrical power from the PSD. The above-detailed steps generally do not necessarily have to follow any particular sequence. Once the pertinent, above-detailed, steps are executed, the stated operation is achieved. For example: The positive electrical connection of the operating circuit of the CU to the UD may take place either before or after the PSD receives AC power; electrically connecting the PSD to the UD may take place either before or after the PSD receives the AC power.

For convenience to the reader, many preferred detailed descriptions and various embodiments have been described herein. In the details above and below, it becomes apparent that there are certain useful commonalities and contemplations of specific design and construction that may be incorporated to achieve the desired stated goals. One must continually appreciate many of these commonalities and contemplations. It should be understood that certain desired enhancing features may be included in a finished product, but not to be, in any way, limited by them.

In various embodiments, the invention may receive power via plug prongs located directly on the device. The invention may alternatively be connected by a cord connected plug that plugs into an electrical outlet for receiving said power. The invention may alternatively be connected by hard wiring to the supply source.

In various embodiments, the invention may include; hard-wiring, and/or cord wiring of either the primary and/or secondary circuits and/or control circuits. For instance, the secondary, output side of the invention, and/or the control circuit(s), may be by a cord connected plug that plugs into a utilization device; the secondary, output side of the invention, and/or the control circuit(s), may be by plug prongs, located on the device itself, and/or located on the utilization device, for plugging the invention into a utilization device; the secondary, output side of the invention, and/or the control circuit(s), may be by hard wiring to the utilization device.

In various embodiments, the invention may include; virtually any type available power converter/supply (PCS), as system operation is not dependent on the type of PCS utilized, but on system ability to switch on and off the primary power to the PCS. Various types of power supplies include, but are not limited to; linear type; unregulated type; linear regulated type; switching type; and ripple-regulated type. Some of these PCS listed types can include logic circuits that cut back on charging once the UD is fully charged, or not using power, allowing for additional power savings in non-wasted power, such as with a switching power supply for low power consumption. Some of these PCS listed types may include smoothing, filtering, and a myriad of other enhancing features. Some of these PCS listed types can include illumination device(s), viewable from outside the finished product, for alerting the user when the system is providing converted power.

In various embodiments, the invention may include; make-before-break functionality of the switching circuitry, so that when the system is switching from an external storage device, or supplementary power, power provided by the PSD system when it is energized supplements the ESD power before ESD power is dropped, to ensure a non-interrupted power supply during switch-over from ESD to PSD system power phase of operation. Power supplies with good ride-through, high efficiency, and/or slow discharge characteristics may be desirable in any given configuration, and the use of capacitor or capacitors to buttress prolonged power supply during the ESD to PSD switch-over, may be desirable in any given configuration as well. Various embodiments may utilize electro-mechanical relays, contacts, silicon controlled rectifier or semiconductor-controlled rectifier (SCR), transistor, and/or metal-oxide-semiconductor field-effect transistor (MOSFET) in the circuitry.

In various embodiments, the energy storage device (ESD) may be of any configuration-suitable device or devices, such as battery, batteries, capacitor, and/or capacitors, for some examples of the type or types that may be incorporated, connected along with any discharge control or control(s) as may be desirable for a working end product or products; not limited to any of these descriptions or types.

In various embodiments, the invention may include; a power transformer/supply for transforming DC-to-DC power, rather than, or in conjunction with, the AC-to-DC converter discussed previously herein; such as when the primary power supply is at one DC voltage and a second DC voltage output from the transformer is desired, such as when a DC battery source at one voltage is available to power a utilization device at another voltage.

In various embodiments, the invention may include; a primary side pushbutton start switch, circuited across the contact points of a control unit of invention for instance, so that operating the pushbutton start switch closes the primary circuit, causing the power converter/supply, the power transformer/supply, and/or the power inverter/supply to produce power, such as in the case of a dead or un-charged system or utilization device energy storage device, where no system start power is available; the system is started by the pushbutton start switch.

In various embodiments, the invention may include; an onboard energy storage device charger, wired to charge the energy storage device when the system is in the "on" state.

In various embodiments, the invention may include; the power circuit supplied to the utilization device containing any required control circuit(s), along with an unlimited number of other unrelated conductors, allowing added functionalities. For example: a cord set connected between the invention and a utilization device may contain the power conductors, the control conductor(s), conductors that signal utilization state or other logic, such as in the multi-conductor connections of mini and micro USB sets that contain a myriad of function, logic control, annunciation, etc.

In various embodiments of the invention, it should be understood that while the included drawing detail electro-mechanical type components for ease of understanding of the disclosed invention, various, or all elements, of the circuitry of the invention may utilize electronic, transistor, integrated circuit, and/or electro-mechanical components, and may incorporate such technology as make-before-break and/or circuit holding components, however specific functionality may be desired in a finished product.

In various embodiments, the invention may include; an ability to connect to, or accommodate, a plurality of utilization devices.

Referring now to the drawings, FIG. 1 depicts an energy efficient power supply, power supply device and/or charger (PSD) 100 according to a schematic block diagram; one embodiment of the invention. PSD 100 includes an input 10 for receiving power from a power source (not shown). PSD 100 includes a power converter/supply (PCS) 11. PCS 11 is electrically connectable, via a power source switching module 12, with the mains electrical input 10 for converting the AC power into a DC power. The power source switching module 12 is electrically connectable with the PCS 11 primary power input 10; the power source switching module 12 capable of opening and/or closing the electrical connection between the power input 10 and PCS 11. The power source switching module 12 is electrically connectable with an energy storage device (ESD) 13. A control circuit 14 is electrically connectable between PSD 100 and a utilization device (UD) 15. A power output capable circuit 16 is electrically connectable between PSD 100 and a UD 15. In a preferred configuration and operation, input 10 is connected to a power source (not shown); PSD 100 is connected to the UD 15 with both the control circuit 14 and the PSD 100 power circuit 16. Control circuit 14 electrically carries the grounded portion of PSD 100 power circuit 16 to a grounding element of the power source switching module 12 via the PSD 100 to UD 15 connection 14, connecting with the grounded portion of PSD 100 power output 16 at UD 15. UD 15 may also be capable of, separately and/or independently, electrically opening/closing the connection between the control circuit 14 and the PSD 100 power circuit grounded portion 16, by switching means (not shown) in addition to the basic electrical connection of control circuit 14 and the PSD 100 power circuit 16 at UD 15. With the electrical connection of control circuit 14 and the PSD 100 power circuit 16 at UD 15, control circuit 14 provides an electrical ground to, what was once an open ground circuit of an operating element of the power source switching module 12; and with the power input from ESD 13 electrically connected, by default, to the operating element of the power source switching module 12, power source switching module 12 operates to electrically connect input 10 to PCS 11, causing electrical power to be conducted to UD 15 through PSD 100 power circuit 16. Power output of PCS 11 is also connected to a switchover element of power source switching module 12, the switchover element causing the power of PCS 11 to hold the electrical connection of input 10 to PCS 11 closed through power source switching module 12, and opens the electrical connection of ESD 13 to power source switching module 12. If ESD 13 is incapable of providing a required power to the power source switching module 12, a user operable bypass switch 17, may be operated by a user (bypass switch 17 may be operable externally to PSD 100), manually connecting electrical input 10 to the electrical primary side of PCS 11, with the connection held closed by virtue of the electrical connection of control circuit 14 to the grounding element of the power source switching module 12, made by the connection at a UD 15 of control circuit 14 to the grounded portion of PSD 100 power output 16, or by a UD 15, itself being capable of internally electrically closing the connection between the control circuit 14 and the PSD 100 power circuit ground portion 16 when those circuits are connected to a UD 15. An energy storage device charger 18 may be incorporated in the system, connected to either the mains power portion of PCS 11, or alternately (not shown), to the power output portion of the PCS 11, as manufacture configured for desired operation and functionality. When the mains power is feeding the PCS 11, or PCS 11 is outputting power, depending on the type of connection a specifically used energy storage device charger 18 requires, energy storage device charger 18 may charge the energy storage device 13; the energy storage device charger 18 may contain logic circuitry to discontinue charging of the energy storage device 13 when it is fully charged, or at other design definable times.

Figure 2:
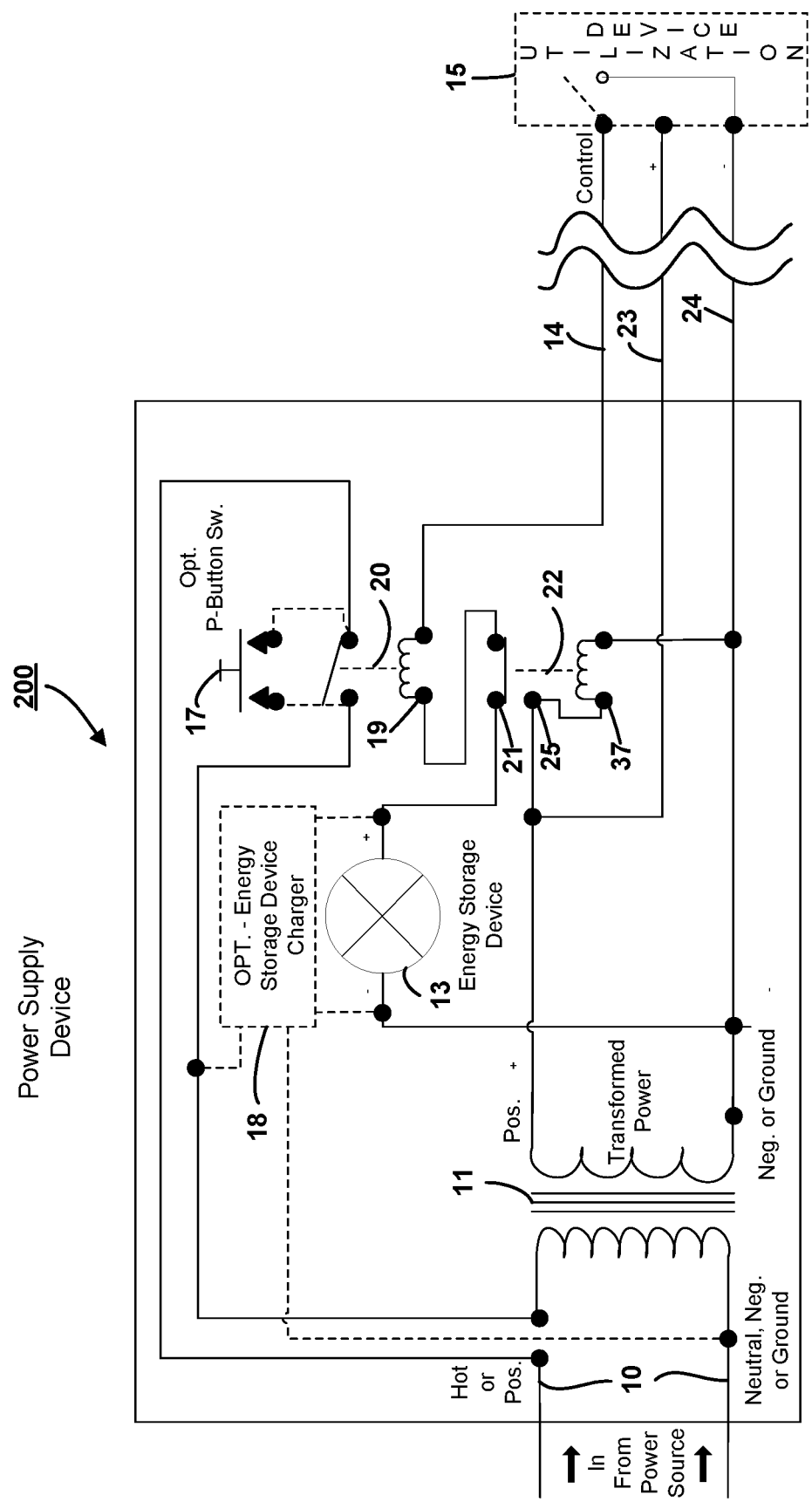
FIG. 2 is a schematic diagram of a power supply device for powering and/or charging a utilization device in accordance with one embodiment of the present invention; wherein the power supply device is illustrated using an onboard energy storage device and an energy storage device charger connected to primary voltage; the power supply device shown in a utilization device disconnected state.

Referring to FIG. 2, one embodiment of the present invention is shown in schematic form. The energy efficient power supply, power supply device and/or charger (PSD) 200 receives an AC power via a mains electrical input 10, which connection may be by plug prongs (not shown) located on PSD 200, the prongs capable of being plugged into an electrical outlet (not shown) for receiving the AC power. PSD 200 may alternatively be connected by a cord connected plug (not shown) that plugs into an electrical outlet (not shown) for receiving said AC power. PSD 200 may alternatively be connected by hard wiring to the supply source (not shown). The positive connection of an operating circuit component 19 (showing in this embodiment, an electrical coil) of a second control unit (SCU) 20 (showing in this embodiment, an electro-mechanical contact) electrically connects to the positive output of an energy storage device (ESD) 13 via a first switching portion 21 of a first control unit (FCU) 22 (showing in this embodiment, an electro-mechanical contact). The negative side of ESD 13 is grounded to the system ground circuit 24. PSD 200 is electrically connected to a utilization device (UD) 15 with a control circuit 14 and with a power circuit; the power circuit made up of the positive circuit 23 and the ground circuit 24 of a power converter/supply (PCS) 11; such that when this connection is made at UD 15, control circuit 14 is connected to the ground circuit 24 of power converter/supply (PCS) 11, allowing control circuit 14 to provide an electrical ground to the operating circuit component 19 ground of SCU 20; wherein when the positive connection of the operating circuit component 19 of SCU 20 is connected to ESD 13 via a first switching portion 21 of FCU 22, and when the connection to the UD 15 with a system ground circuit 24, which provides an electrical ground to the operating circuit ground of the SCU 20 via the control circuit 14 is made, SCU 20 electrically connects electrical input 10 AC with the electrical primary side of the PCS 11, thus causing a DC electrical voltage to be present at the electrical secondary side of the PCS 11; next, the said DC electrical voltage is conducted to a second switching portion 25 of the FCU 22 and to the UD 15 through positive circuit 23 to provide electrical power at a UD 15. The said DC electrical voltage from PCS 11 is also conducted to an operating circuit component 37 (showing in this embodiment, an electrical coil, already connected to system ground circuit 24) of FCU 22; FCU 22 acting to disconnect the positive electrical output from ESD 13 to operating circuit component 19 at FCU 22, while connecting said DC electrical voltage from PCS 11 at FCU 22 to operating circuit component 19, thereby supplanting the electrical power to operating circuit component 19 that was once provided by ESD 13, which has now become electrically disconnected from operating circuit component 19, at FCU 22. In various embodiments, connecting PSD 200 to a UD 15, thereby providing a previously non-existent system ground circuit 24 to the operating circuit component 19 ground of the SCU 20 via the control circuit 14 can be achieved by simply making the said connection. However, when a UD 15 is configured as a "smart device", designed to work with a PSD 200 technology which is the subject of this disclosure, the opening and/or closing of the converted system electrical ground 24 and the control circuit 14; thereby controlling the "on" and "off" switching of the PSD 200 by the UD 15, is possible; thus, the UD 15 can control the electrical turning on and/or turning off of the AC circuit to the electrical primary side of the PCS 11; hence, zero electrical power is utilized by the PSD 200 when the PSD 200 is disconnected from the UD 15, or in any case where the electrical circuit connection between the converted system electrical ground 24 and the control circuit 14 is open, such as when the UD 15 signals that it no longer needs electrical power from the PSD 200, by the UD 15 opening the control circuit. If ESD 13 is incapable of providing a required power to the first switching portion 21 of FCU 22, a user operable bypass switch 17, may be operated by a user (bypass switch 17 may be operable externally to PSD 200), manually connecting electrical input 10 to the electrical primary side of PCS 11, with the connection held closed by virtue of the electrical connection of control circuit 14 to the operating circuit component 19 ground of the SCU 20, made by the connection at a UD 15 of control circuit 14 to the grounded portion of PSD 200 system ground circuit 24, or by a UD 15, itself being capable of internally electrically closing the connection between the control circuit 14 and the PSD 200 system ground circuit 24 when those circuits are connected to a UD 15. An energy storage device charger 18 may be incorporated in the system, connected to either the mains power portion of PCS 11, or alternately (not shown), to the power output portion of the PCS 11, as manufacture configured for desired operation and functionality. When the mains power is feeding the PCS 11, or PCS 11 is outputting power, depending on the type of connection a specifically used energy storage device charger 18 requires, energy storage device charger 18 may charge the energy storage device 13; the energy storage device charger 18 may contain logic circuitry to discontinue charging of the energy storage device 13 when it is fully charged, or at other design definable times.

Figure 3:
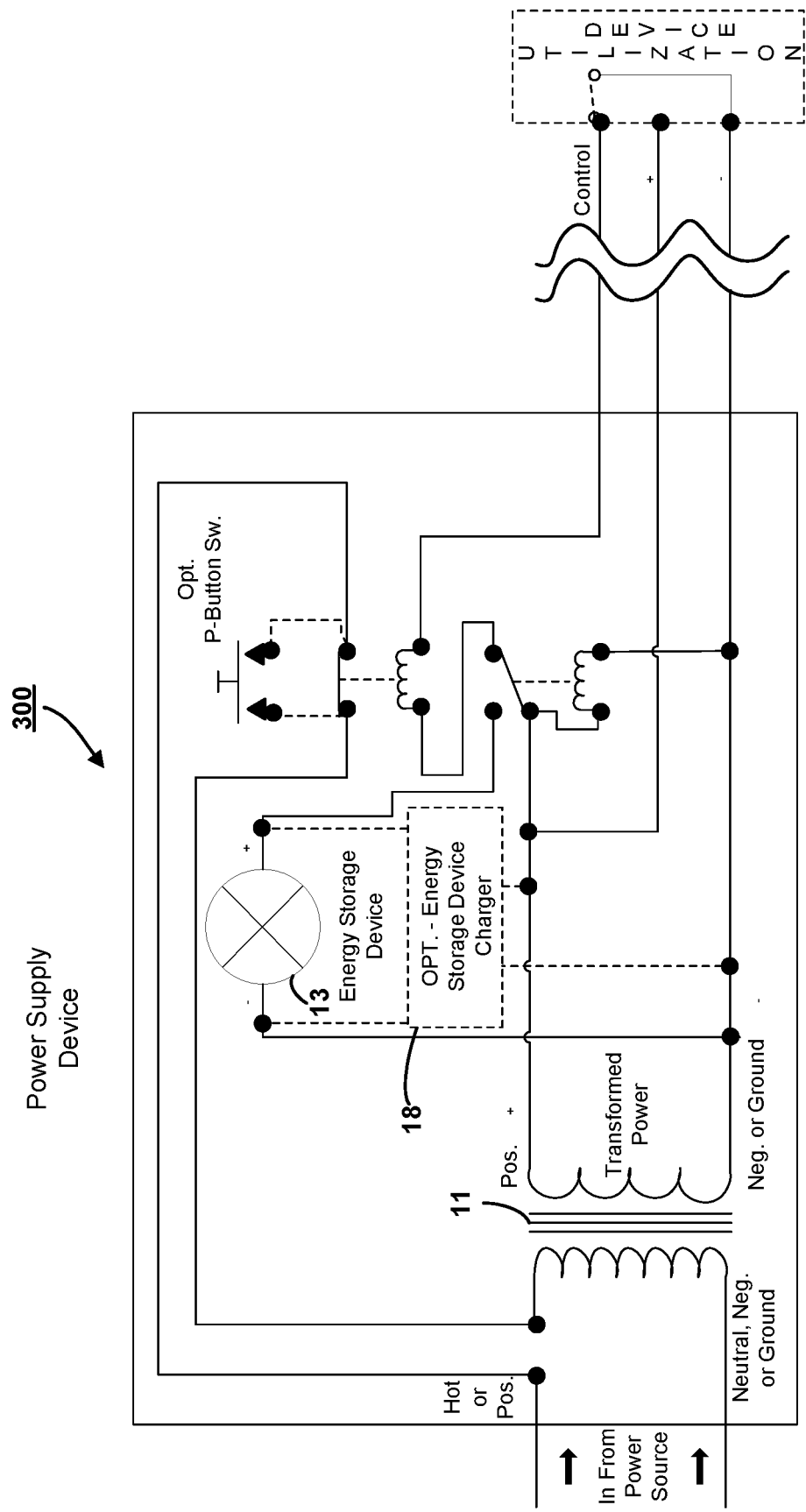
FIG. 3 is a schematic diagram of a power supply device for powering and/or charging a utilization device in accordance with one embodiment of the present invention; wherein the power supply device of FIG. 2 is illustrated using an onboard energy storage device and an energy storage device charger connected to secondary voltage; the power supply device shown in a utilization device connected state.

Referring to FIG. 3, one embodiment of the present invention is shown in schematic form, wherein the energy efficient power supply, power supply device and/or charger (PSD) 300 is essentially identical to form and function of PSD 200 of FIG. 2, excepting that the energy storage device charger 18 of FIG. 3 is connected to the power output portion of the power converter/supply (PCS) 11. When the PCS 11 is outputting power, energy storage device charger 18 may charge the energy storage device 13; the energy storage device charger 18 may contain logic circuitry to discontinue charging of the energy storage device 13 when it is fully charged, or at other design definable times.

Figure 4:
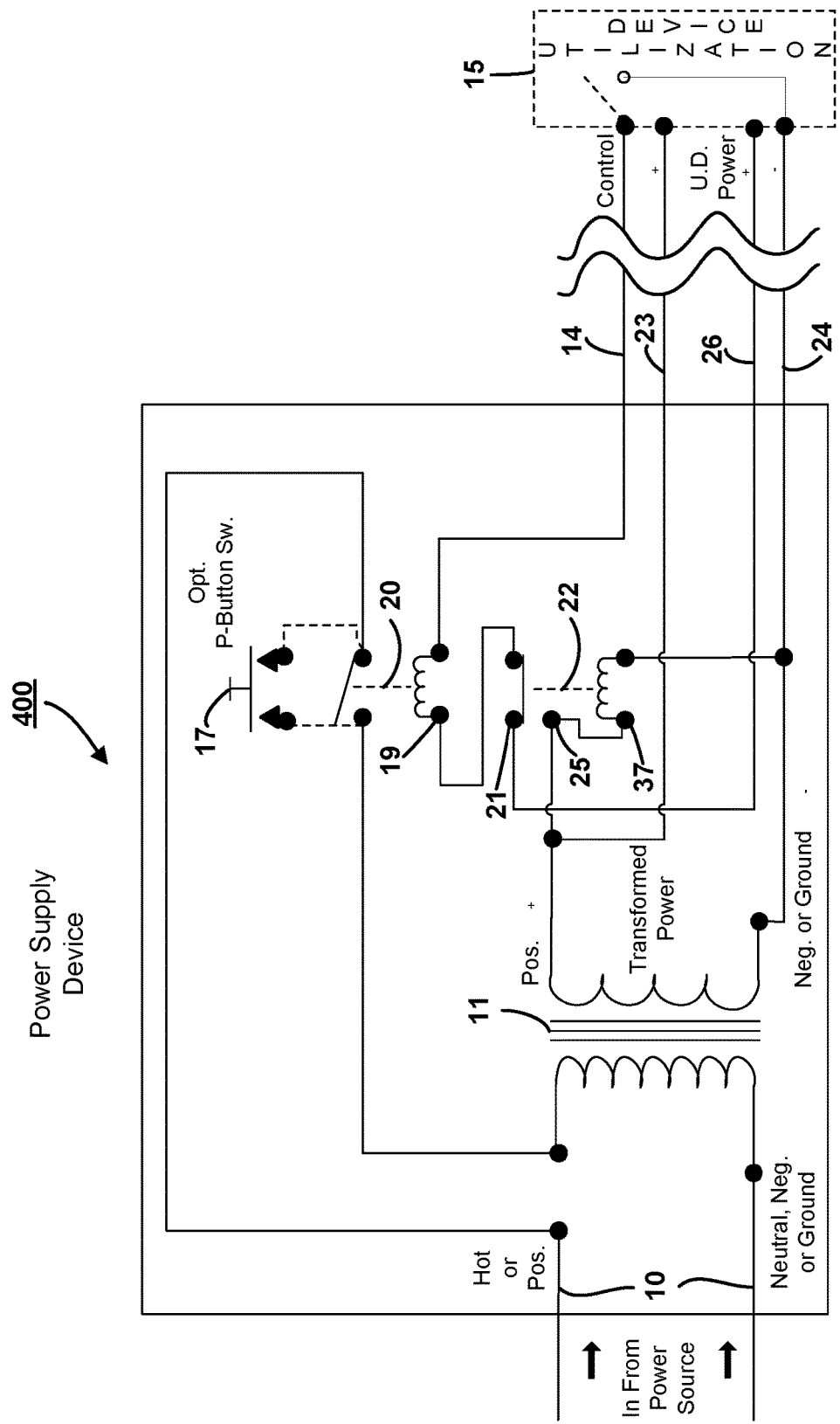
FIG. 4 is a schematic diagram of a power supply device for powering and/or charging a utilization device in accordance with one embodiment of the present invention; wherein the power supply device is illustrated obtaining control electrical power derived from a utilization device; the power supply device shown in a utilization device disconnected state.

Referring to FIG. 4, one embodiment of the present invention is shown in schematic form. The energy efficient power supply, power supply device and/or charger (PSD) 400 receives an AC power via a mains electrical input 10, which connection may be by plug prongs (not shown) located on PSD 400, the prongs capable of being plugged into an electrical outlet (not shown) for receiving the AC power. PSD 400 may alternatively be connected by a cord connected plug (not shown) that plugs into an electrical outlet (not shown) for receiving said AC power. PSD 400 may alternatively be connected by hard wiring to the supply source (not shown). The positive connection of an operating circuit component 19 (showing in this embodiment, an electrical coil) of a second control unit (SCU) 20 (showing in this embodiment, an electro-mechanical contact) electrically connects, via a first switching portion 21 of a first control unit (FCU) 22 (showing in this embodiment, an electro-mechanical contact), to a positive power output circuit 26 of a utilization device (UD) 15. PSD 400 is connectable to UD 15 with a control circuit 14 and with a power circuit; the power circuit made up of a positive circuit 23, a ground circuit 24 of a power converter/supply (PCS) 11, and the positive output power circuit 26 from UD 15; such that when this connection is made at UD 15, control circuit 14 is connected to the ground circuit 24 of power converter/supply (PCS) 11, allowing control circuit 14 to provide an electrical ground to the operating circuit component 19 ground of SCU 20; wherein when the positive connection of the operating circuit component 19 of SCU 20 is connected to the positive power output circuit 26 via a first switching portion 21 of FCU 22, and when the connection to the UD 15 with the system ground circuit 24, which provides an electrical ground to the operating circuit ground of the SCU 20 via the control circuit 14 is made, SCU 20 electrically connects electrical input 10 AC with the electrical primary side of the PCS 11, thus causing a DC electrical voltage to be present at the electrical secondary side of the PCS 11; next, the said DC electrical voltage is conducted to a second switching portion 25 of the FCU 22 and to the UD 15 through positive circuit 23 to provide electrical power at the UD 15. The said DC electrical voltage from PCS 11 is also conducted to an operating circuit component 37 (showing in this embodiment, an electrical coil, already connected to system ground circuit 24) of FCU 22; FCU 22 acting to disconnect the positive output power circuit 26 from UD 15 to operating circuit component 19 at FCU 22, while connecting said DC electrical voltage from PCS 11 at FCU 22 to operating circuit component 19, thereby supplanting the electrical power to operating circuit component 19 that was once provided by the positive output power circuit 26 from UD 15, which has now become electrically disconnected from operating circuit component 19, at FCU 22. In various embodiments, connecting PSD 400 to a UD 15, thereby providing a previously non-existent system ground circuit 24 to the operating circuit component 19 ground of the SCU 20 via the control circuit 14 can be achieved by simply making the said connection. However, when a UD 15 is configured as a "smart device", designed to work with a PSD 400 technology which is the subject of this disclosure, the opening and/or closing of the converted system electrical ground 24 and the control circuit 14; thereby controlling the "on" and "off" switching of the PSD 400 by the UD 15, is possible; thus, the UD 15 can control the electrical turning on and/or turning off of the AC circuit to the electrical primary side of the PCS 11; hence, zero electrical power is utilized by the PSD 400 when the PSD 400 is disconnected from the UD 15, or in any case where the electrical circuit connection between the converted system electrical ground 24 and the control circuit 14 is open, such as when the UD 15 signals that it no longer needs electrical power from the PSD 400, by the UD 15 opening the control circuit. If the positive power output circuit 26 is incapable of providing a required power to the first switching portion 21 of FCU 22, a user operable bypass switch 17, may be operated by a user (Bypass switch 17 may be operable externally to PSD 400), manually connecting electrical input 10 to the electrical primary side of PCS 11, with the connection held closed by virtue of the electrical connection of control circuit 14 to the operating circuit component 19 ground of the SCU 20, made by the connection at a UD 15 of control circuit 14 to the grounded portion of PSD 400 system ground circuit 24, or by a UD 15, itself being capable of internally electrically closing the connection between the control circuit 14 and the PSD 400 system ground circuit 24 when those circuits are connected to a UD 15.

Figure 5:
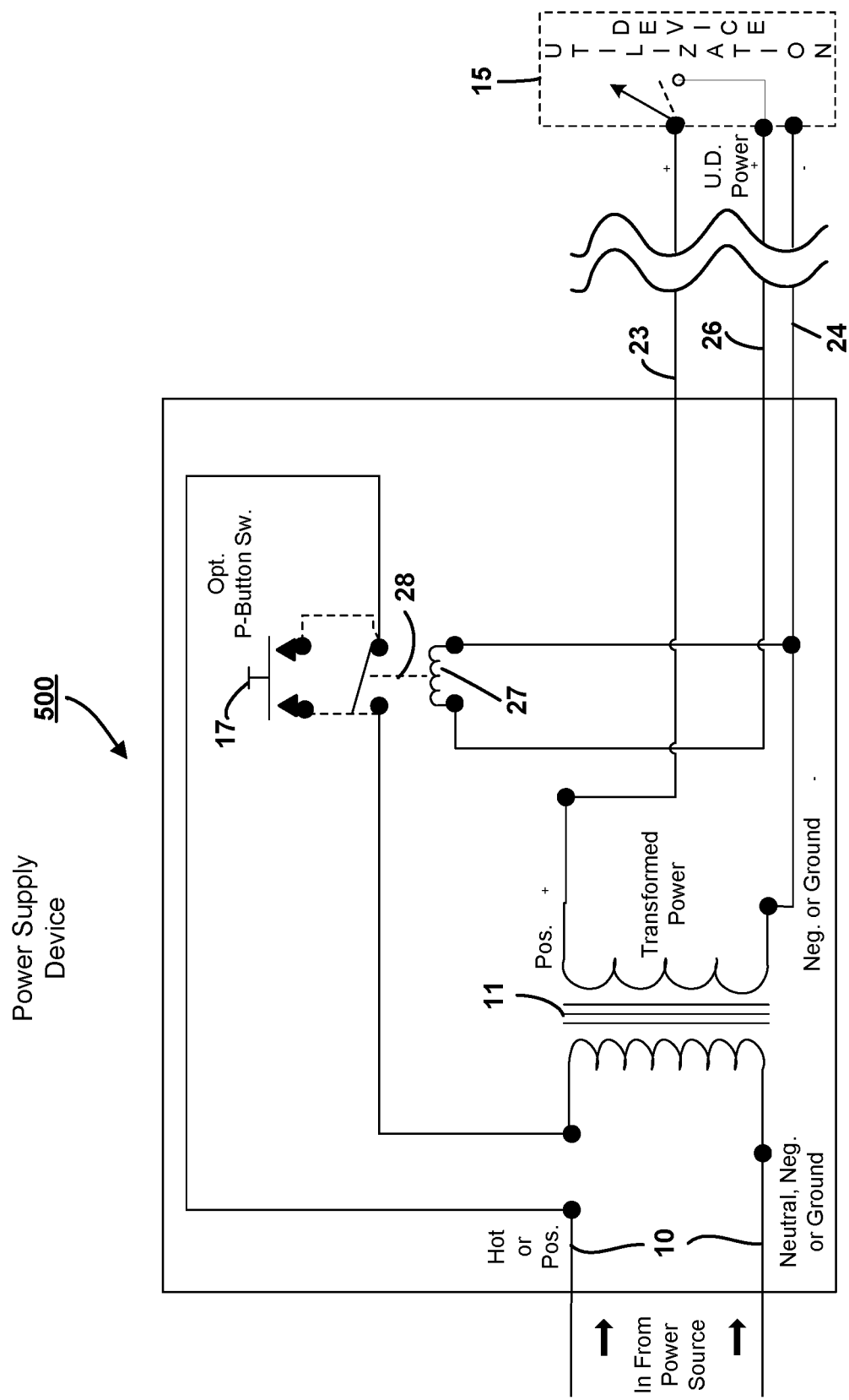
FIG. 5 is a schematic diagram of a power supply device for powering and/or charging a utilization device in accordance with one embodiment of the present invention; wherein the power supply device is illustrated obtaining control electrical positive from a utilization device; the power supply device shown in a utilization device disconnected state.

Referring to FIG. 5, one embodiment of the present invention is shown in schematic form. The energy efficient power supply, power supply device and/or charger (PSD) 500 receives an AC power via a mains electrical input 10, which connection may be by plug prongs (not shown) located on PSD 500, the prongs capable of being plugged into an electrical outlet (not shown) for receiving the AC power. PSD 500 may alternatively be connected by a cord connected plug (not shown) that plugs into an electrical outlet (not shown) for receiving said AC power. PSD 500 may alternatively be connected by hard wiring to the supply source (not shown). The positive connection of an operating circuit component 27 (showing in this embodiment, an electrical coil, already connected to system ground circuit 24) of a control unit (CU) 28 (showing in this embodiment, an electro-mechanical contact) electrically connects to a utilization device (UD) 15 via a power circuit; the power circuit made up of a positive circuit 23, a ground circuit 24 of a power converter/supply (PCS) 11, and a positive output power circuit 26 from UD 15; such that when this connection is made at UD 15, positive output power circuit 26 from UD 15 is allowed to provide electrical power to the positive connection of operating circuit component 27; the negative connection of operating circuit component 27 is connected to the ground circuit 24 of power converter/supply (PCS) 11; wherein when the positive connection of the operating circuit component 27 of CU 28 is connected to the positive output power circuit 26 and is receiving power from UD 15, CU 28 electrically connects electrical input 10 AC power with the electrical primary side of the PCS 11, thus causing a DC electrical voltage to be present at the electrical secondary side of the PCS 11; next, the said DC electrical voltage is conducted to UD 15 via positive circuit 23; in this described embodiment, positive circuit 23 acting as a control circuit. In various embodiments, simply connecting PSD 500 to a UD 15 provides a previously non-existent positive output power circuit 26 from UD 15 to the operating circuit component 27 ground of CU 28, causing the PSD 500 system to switch to an on state simply by making the said connection. However, when a UD 15 is configured as a "smart device", designed to work with a PSD 500 technology which is the subject of this disclosure, UD 15 may provide the "on" and "off" switching of the PSD 500 by the UD 15 switching positive output power circuit 26 "on" and "off"; thereby turning on and/or turning off of the AC circuit to the electrical primary side of the PCS 11; hence, zero electrical power is utilized by the PSD 500 when the PSD 500 is disconnected from the UD 15, or in any case where PSD 500 is connected to a UD 15, but UD 15 signals that it no longer needs electrical power from the PSD 500 by opening the positive output power circuit 26. If the positive output power circuit 26 is incapable of providing a required power to the positive connection of operating circuit component 27, such as in a case where UD 15 has a discharged battery (not shown), a user operable bypass switch 17, may be operated by a user (Bypass switch 17 may be operable externally to PSD 500), manually connecting electrical input 10 to the electrical primary side of PCS 11, with the connection held closed by virtue of the electrical power thereby provided from power converter/supply (PCS) 11 flowing to UD 15 via positive circuit 23, then to operating circuit component 27 of CU 28 via then existent positive output power circuit 26.

Figure 6:
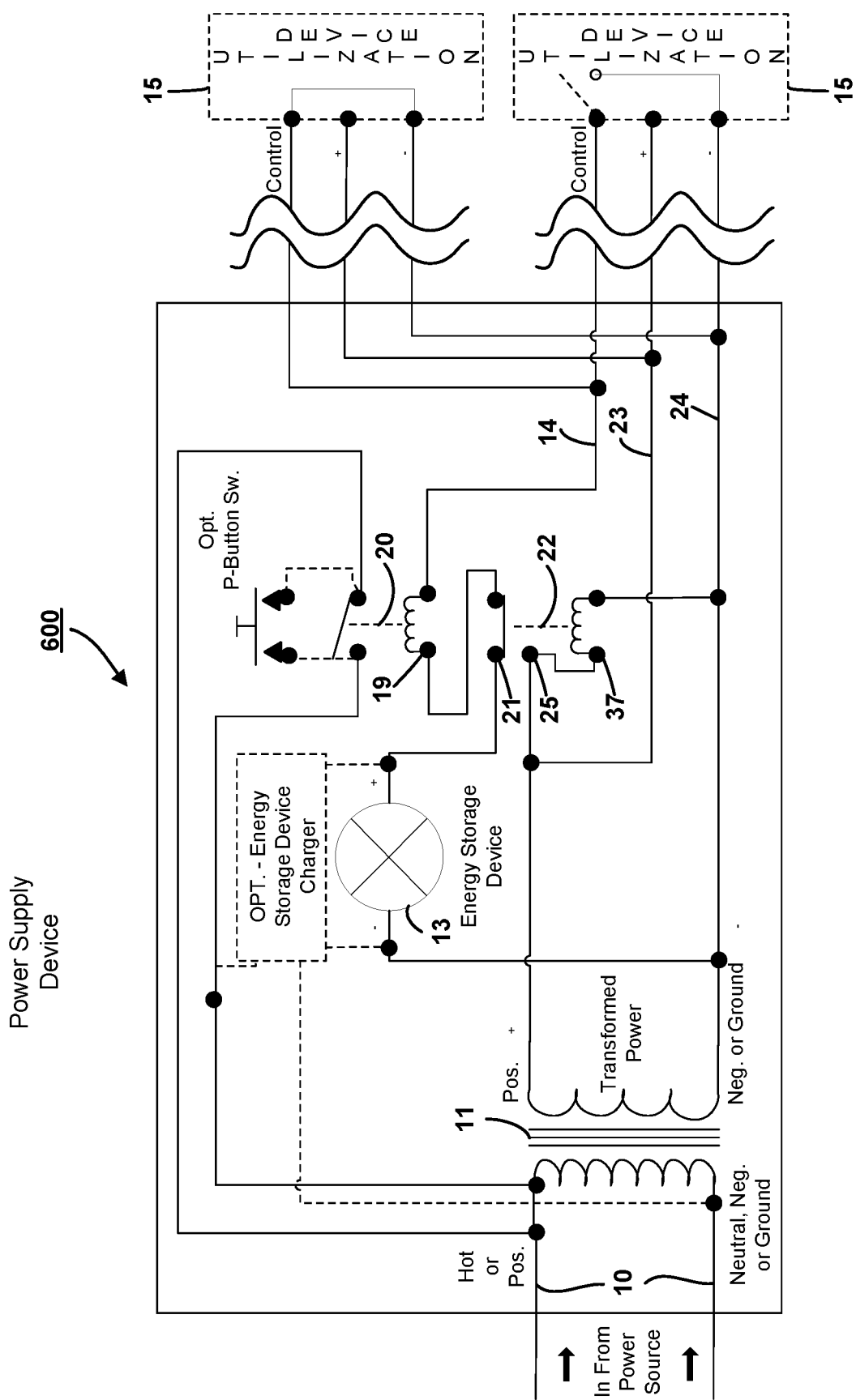
FIG. 6 is a schematic diagram of a power supply device for powering and/or charging utilization devices in accordance with one embodiment of the present invention; wherein the power supply device is illustrated with a capability of being connected to one, or more, utilization devices; the power supply device shown in a utilization device disconnected state.

Referring to FIG. 6, one embodiment of the present invention is shown in schematic form, wherein the energy efficient power supply, power supply device and/or charger (PSD) 600 is essentially identical to form and function of PSD 200 of FIG. 2, excepting that PSD 600 may be provisioned to connect to multiple UD's 15 via multiple cord connectors (not shown beyond simple connection points), connected in a parallel circuit configuration to one another; wherein when any and/or all of the UD 15 connections are made, control circuit 14 is connected to the ground circuit 24 of power converter/supply (PCS) 11, allowing control circuit 14 to provide an electrical ground to the operating circuit component 19 (showing in this embodiment, an electrical coil) ground of SCU 20; wherein when the positive connection of the operating circuit component 19 of SCU 20 is connected to ESD 13 via a first switching portion 21 of FCU 22, and when the connection to any and/or all UD 15 with a system ground circuit 24, which provides an electrical ground to the operating circuit ground of the SCU 20 via the control circuit 14 is made, SCU 20 electrically connects electrical input 10 AC with the electrical primary side of the PCS 11, thus causing a DC electrical voltage to be present at the electrical secondary side of the PCS 11; next, the said DC electrical voltage is conducted to a second switching portion 25 of the FCU 22 and to the connected UD 15 through positive circuit 23 to provide electrical power at a UD 15. The said DC electrical voltage from PCS 11 is also conducted to an operating circuit component 37 (showing in this embodiment, an electrical coil, already connected to system ground circuit 24) of FCU 22; FCU 22 acting to disconnect the positive electrical output from ESD 13 to operating circuit component 19 at FCU 22, while connecting said DC electrical voltage from PCS 11 at FCU 22 to operating circuit component 19, thereby supplanting the electrical power to operating circuit component 19 that was once provided by ESD 13, which has now become electrically disconnected from operating circuit component 19, at FCU 22.

Figure 7:
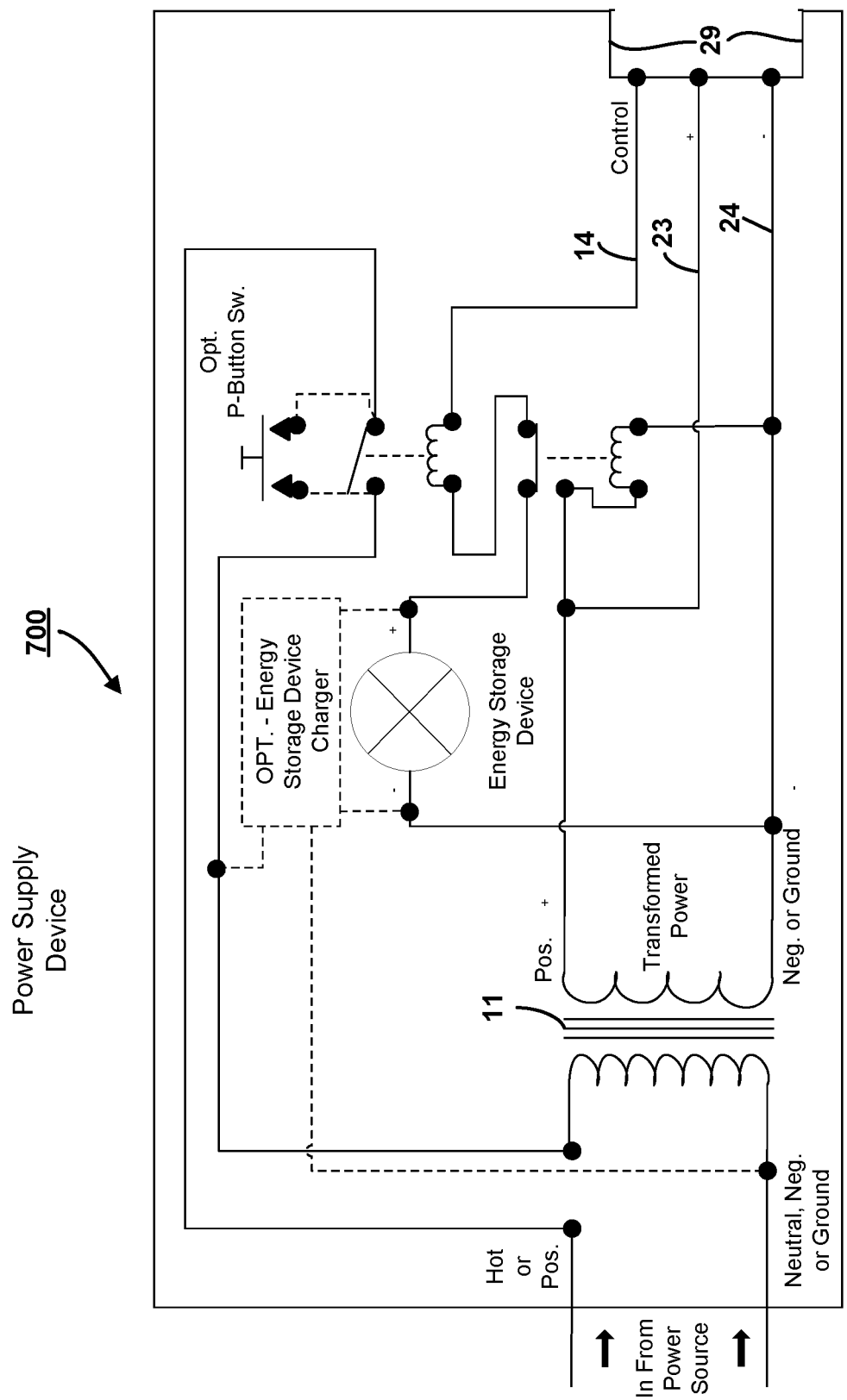
FIG. 7 is a schematic diagram of a power supply device for powering and/or charging a utilization device in accordance with one embodiment of the present invention; wherein the power supply device is illustrated with utilization device connectors located at, or within, the power supply device body; the power supply device shown in a utilization device disconnected state.

Referring to FIG. 7, one embodiment of the present invention is shown in schematic form, wherein the energy efficient power supply, power supply device and/or charger (PSD) 700 is essentially identical to form and function of PSD 200 of FIG. 2, excepting that PSD 700 may be provisioned with a PSD 700 device mounted connector 29; wherein connection of control circuit 14, positive circuit 23 and the ground circuit 24 of a power converter/supply (PCS) 11 may be made at device mounted connector 29.

Figure 8:
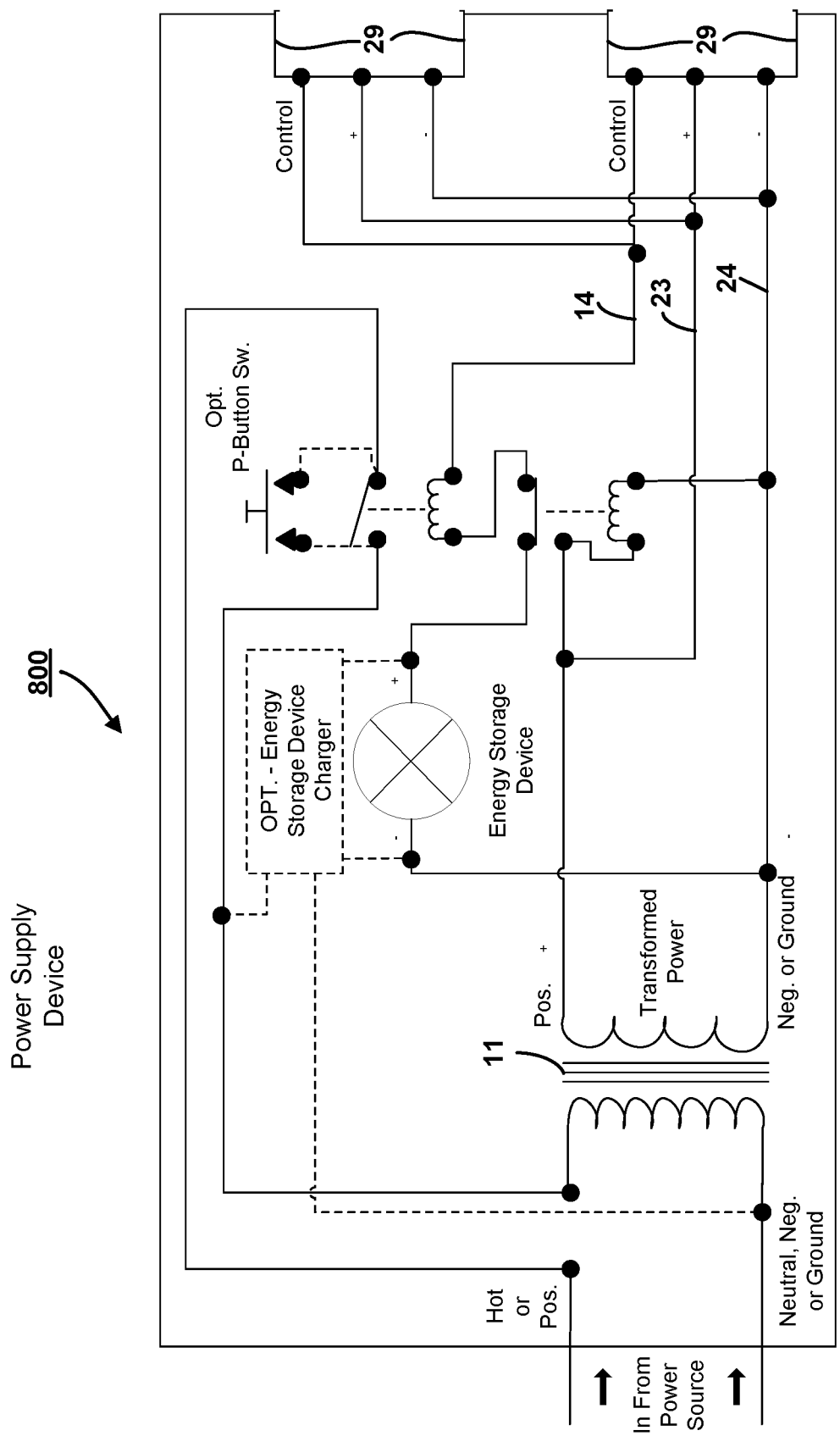
FIG. 8 is a schematic diagram of a power supply device for powering and/or charging utilization devices in accordance with one embodiment of the present invention; wherein the power supply device is illustrated with a capability of being connected to one, or more, utilization devices; wherein the power supply device is illustrated with utilization device connectors located at, or within, the power supply device body; the power supply device shown in a utilization device disconnected state.

Referring to FIG. 8, one embodiment of the present invention is shown in schematic form, wherein the energy efficient power supply, power supply device and/or charger (PSD) 800 is essentially identical to form and function of PSD 200 of FIG. 2, excepting that PSD 800 may be provisioned with multiple PSD 800 device mounted connectors 29; wherein connection of control circuit 14, positive circuit 23 and the ground circuit 24 of a power converter/supply (PCS) 11 may be made at any and/or all of the device mounted connectors 29.

Figure 9A:
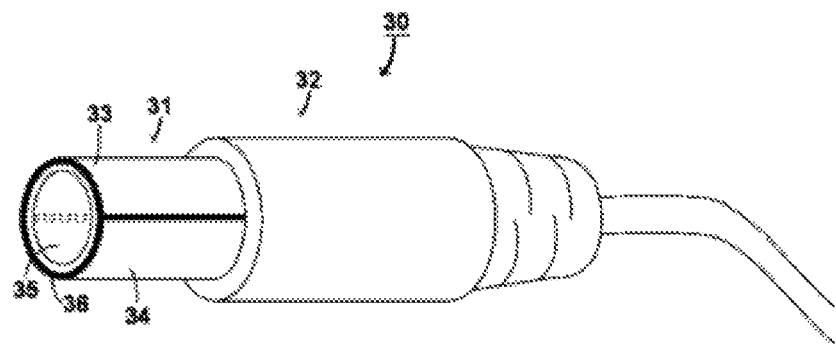
FIG. 9A is an illustration of a transformed power cord connector of a power supply device for powering and/or charging utilization devices; wherein the connector includes power and control connections for the power supply device.

Referring to FIG. 9A, one embodiment of a power cord connector 30 portion of the present invention is shown in illustration form in accordance with a preferred embodiment of the present invention, wherein a barrel type power cord connector 30 similar to popular barrel type cord connectors for plugging and unplugging into a power jack (not shown) comprises a plug end 31 and a manipulating portion 32, held by a user to enable attaching and detaching the power cord connector 30. Plug end 31 is configured with a first conductive outer piece 33 and a second conductive outer piece 34 electrically separated from one another through various means; wherein when the power cord connector 30 is inserted into a power jack, first conductive outer piece 33 electrically connects to second conductive outer piece 34 by means of each contacting an outer conductive piece of the power jack (not shown); with an inner connector conductive piece 35 carrying positive power to and/or from a utilization device (not shown) by making contact with an inner conductive piece of the power jack (not shown). First conductive outer piece 33, second conductive outer piece 34, and inner connector conductive piece 35 are each electrically isolated from one another by means of insulation 36.

Figure 9B:
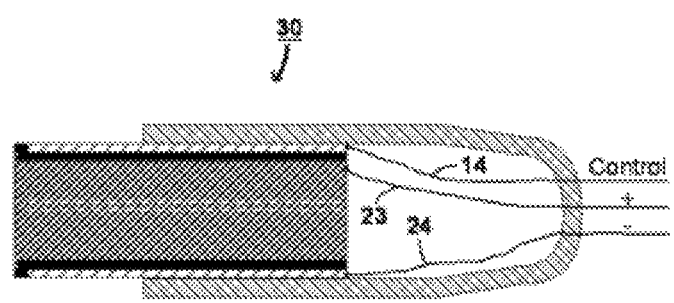
FIG. 9B is a cross-sectional, side view of a transformed power cord connector of a power supply device for powering and/or charging utilization devices; wherein the connector includes power and control connections for the power supply device.

Referring to FIG. 9B, one embodiment of a power cord connector 30 portion of the present invention is shown in cross-sectional, side view form in accordance with a preferred embodiment of the present invention, wherein, as described herein for FIG. 2 for instance, control circuit 14 is connected to the ground circuit 24 when power cord connector 30 is inserted into a power jack (not shown) and positive circuit 23 may provide electrical power at the power jack.

What is claimed is:

1. An energy efficient power supply device and/or charger (PSD), comprising:
   a power converter/supply (PCS) for converting an AC power into a DC power;
   a power source electrical input for receiving power from a power source;
a power source switching module;
   an energy storage device (ESD), the ESD having at least one positive connection and at least one negative connection;
   an energy storage device (ESD) charger connectable to the ESD, the ESD charger connectable to and receiving its operating power from the power source electrical input or from electrical output of the power converter/supply (PCS), the ESD charger charges/re-charges the ESD as configurably desired in an end product;
   a control circuit (CC) electrically connectable between the PSD and a utilization device (UD); and
   a power output capable circuit (POCC) the POCC made up of, at least, a positive circuit and of a system ground circuit of the PCS, the POCC electrically connectable between the PSD and a UD; wherein when a power source electrical input of the PCS is connectable to the power source and the PSD is connected to a UD with both the CC and the POCC, said CC electrically carries the grounded portion of the POCC to a grounding element of the power source switching module via the PSD to UD, CC connection, connecting it with the grounded portion of the POCC at the UD; wherein with the electrical connection of said CC and said POCC at the UD, the CC provides an electrical ground to what was once an open ground circuit of an electrical operating element of said power source switching module; wherein with the power input from the ESD electrically connected to a positive electrical operating element of the power source switching module and to a switching element of the power source switching module, the power source switching module operates the switching element to electrically connect the power source electrical input to the PCS, causing electrical power to be conducted from the PCS to the UD through the POCC; wherein with power output of the PCS also connected to a switchover element of the power source switching module, the switchover element causes the power output of the PCS to hold the electrical connection of power source electrical input to the PCS closed with the power source switching module, and opens the electrical connection of the ESD to the power source switching module.

2. The energy efficient power supply device and/or charger (PSD) of claim 1, further comprising at least one system bypass to electrically connect the power source electrical input to the power converter/supply (PCS) input.

3. The energy efficient power supply device and/or charger (PSD) of claim 1, wherein the PSD further comprises provisioning to connect to multiple of utilization devices via multiple connectors, connected in a parallel circuit configuration to one another, wherein the PSD may be variably configured for planned utilization differences for the number and type of utilization device requirements anticipated for any given configuration; wherein when any and/or all of the utilization device UD connections are made, the system operates identically to the PSD configured to connect one UD at each then connected UD, excepting that system power output may vary depending on the number and type(s) of UD or UD's connected.

4. The energy efficient power supply device and/or charger (PSD) of claim 1, further comprising illumination device(s), circuit connected to illuminate when electrical power is being produced by the power converter/supply (PCS) and/or when an electrical fault exists with the PSD, viewable from either inside and/or outside the PSD.

5. The energy efficient power supply device and/or charger (PSD) of claim 1, wherein the power converter/supply (PCS) may be of an electrical converter or of an electrical transformer type, and/or may be a type to convert or transform AC power to DC power or DC power to DC power, and/or may be a type with good ride-through, high efficiency, and/or slow discharge characteristics, and/or may use capacitor(s), and/or may be linear type, unregulated type, linear regulated type, switching type, ripple-regulated type, and/or may include circuits that cut back on charging once utilization device(s) is/are fully charged or not using power, and/or may include smoothing, filtering, and/or other desired features.

6. The energy efficient power supply device and/or charger (PSD) of claim 1, wherein the PSD may utilize electro-mechanical, electronic, transistor, and/or integrated circuit components, make-before-break device(s), circuit holding device(s), relay(s), contact(s), silicon controlled rectifier(s), semiconductor-controlled rectifier(s), transistor(s), and/or metal-oxide-semiconductor field-effect transistor(s), or various combinations thereof in the circuitry, however specific functionality may be desired in a finished product.

7. An energy efficient power supply device and/or charger (PSD), comprising:
a power converter/supply (PCS) for converting an AC power into a DC power;
a power source mains electrical input for receiving power from a power source;
a first control unit (FCU);
a first switching portion of the FCU;
a second switching portion of the FCU;
an operating circuit component of the FCU, the positive power input thereof in electrical communication with the second switching portion of the FCU; and
a second control unit (SCU);
an operating circuit component of the SCU; and
an energy storage device (ESD), the ESD having at least one positive connection and at least one negative connection; and
a control circuit; and
a power circuit; the power circuit made up of, at least, a positive circuit and of a system ground circuit of the PCS; wherein the PSD receives power via the power source mains electrical input; the positive connection of the operating circuit component of the SCU electrically connects to the positive output of the ESD via the first switching portion of the first control unit FCU; the negative side of the ESD is grounded to the system ground circuit; when the PSD is electrically connected to a utilization device UD with the control circuit and with the power circuit of the PCS, the control circuit is connected to the ground circuit of the PCS by virtue of that connection causing them to complete the electrical circuit, allowing the control circuit to provide an electrical ground to the operating circuit component ground of the SCU; wherein when the positive connection of the operating circuit component of the SCU is connected to the ESD via the first switching portion of the FCU, and when the connection to the UD with the system ground circuit is present, providing an electrical ground to the operating circuit ground of the SCU via the control circuit is made, the SCU electrically connects the power source mains electrical input with the electrical primary side of the PCS, thus causing a DC electrical voltage to be present at the electrical secondary side of the PCS; next, the said DC electrical voltage then present at the secondary side of the PCS is conducted to the second switching portion of the FCU and to the UD through the positive circuit to provide electrical power at the UD; wherein the said DC electrical voltage from the PCS is also conducted to the positive input of the operating circuit component of the FCU; wherein with the grounding portion of the operating circuit component of the FCU already connected to system ground circuit of the FCU, the FCU acts to switch and disconnect the positive electrical output from the ESD to the operating circuit component of the FCU, while connecting said DC electrical voltage from the PCS to the FCU operating circuit component, thereby supplanting the electrical power to the operating circuit component of the FCU that was once provided by the ESD, which has now become electrically disconnected from the operating circuit component of the FCU.

8. The energy efficient power supply device and/or charger (PSD) of claim 7, further comprising at least one system bypass to electrically connect the power source mains electrical input to the power converter/supply (PCS).

9. The energy efficient power supply device and/or charger (PSD) of claim 7, further comprising at least one energy storage device (ESD) charger connectable to the ESD, the ESD charger connectable to and receiving its operating power from the power source mains electrical input or from electrical output of the power converter/supply (PCS).

10. The energy efficient power supply device and/or charger (PSD) of claim 7, wherein the PSD further comprises provisioning to connect to multiple of utilization devices via multiple connectors, connected in a parallel circuit configuration to one another, wherein the PSD may be variably configured for planned utilization differences for the number and type of utilization device requirements anticipated for any given configuration; wherein when any and/or all of the utilization device UD connections are made, the system operates identically to the PSD configured to connect one UD at each then connected UD, excepting that system power output may vary depending on the number and type(s) of UD or UD's connected.

11. The energy efficient power supply device and/or charger (PSD) of claim 7, further comprising illumination device(s), circuit connected to illuminate when electrical power is being produced by the power converter/supply (PCS) and/or when an electrical fault exists with the PSD, viewable from either inside and/or outside the PSD.

12. The energy efficient power supply device and/or charger (PSD) of claim 7, wherein the power converter/supply (PCS) may be of an electrical converter or of an electrical transformer type, and/or may be a type to convert or transform AC power to DC power or DC power to DC power, and/or may be a type with good ride-through, high efficiency, and/or slow discharge characteristics, and/or may use capacitor(s), and/or may be linear type, unregulated type, linear regulated type, switching type, ripple-regulated type, and/or may include circuits that cut back on charging once utilization device(s) is/are fully charged or not using power, and/or may include smoothing, filtering, and/or other desired features.

13. The energy efficient power supply device and/or charger (PSD) of claim 7, wherein the PSD may utilize electro-mechanical, electronic, transistor, and/or integrated circuit components, make-before-break device(s), circuit holding device(s), relay(s), contact(s), silicon controlled rectifier(s), semiconductor-controlled rectifier(s), transistor(s), and/or metal-oxide-semiconductor field-effect transistor(s), or various combinations thereof in the circuitry, however specific functionality may be desired in a finished product.

14. An energy efficient power supply device and/or charger (PSD), comprising:
a power converter/supply (PCS) for converting an AC power into a DC power;
a power source mains electrical input for receiving power from a power source;
a first control unit (FCU);
a first switching portion of the FCU;
a second switching portion of the FCU;
an operating circuit component of the FCU, the positive power input thereof in electrical communication with the second switching portion of the FCU; and
a second control unit (SCU);
an operating circuit component of the SCU; and
a control circuit; and
a power circuit; the power circuit made up of, at least, a positive circuit and of a system ground circuit of the PCS; wherein the PSD receives power via the power source mains electrical input; wherein when the PSD is electrically connected to a utilization device (UD), the positive connection of the operating circuit component of the SCU electrically connects to the positive output of a power output circuit of the UD via the first switching portion of the first control unit FCU; wherein with the PSD electrically connected to the UD with the control circuit and with the power circuit of the PCS, the control circuit is connected to the ground circuit of the PCS by virtue of that connection causing them to complete the electrical circuit, allowing the control circuit to provide an electrical ground to the operating circuit component ground of the SCU; wherein when the positive connection of the operating circuit component of the SCU is connected to the positive output of the power output circuit of the utilization device UD via the first switching portion of the FCU, and when the connection to the UD with the system ground circuit is present, providing an electrical ground to the operating circuit ground of the SCU via the control circuit is made, the SCU electrically connects the power source mains electrical input with the electrical primary side of the PCS, thus causing a DC electrical voltage to be present at the electrical secondary side of the PCS; next, the said DC electrical voltage then present at the secondary side of the PCS is conducted to the second switching portion and to the UD through the positive circuit to provide electrical power at the UD; wherein the said DC electrical voltage from the PCS is also conducted to the positive input of the operating circuit component of the FCU; wherein with the grounding portion of the operating circuit component of the FCU already connected to system ground circuit of the FCU, the FCU acts to switch and disconnect the positive electrical output from the positive output of the power output circuit of the utilization device UD to the operating circuit component of the FCU, while connecting said DC electrical voltage from the PCS to the FCU positive input of the operating circuit component, thereby supplanting the electrical power to the positive input of the operating circuit component of the FCU that was once provided by the positive output of the power output circuit of the UD, which has now become electrically disconnected from the positive input of the operating circuit component of the FCU.

15. The energy efficient power supply device and/or charger (PSD) of claim 14, further comprising at least one system bypass to electrically connect the power source mains electrical input to the power converter/supply (PCS).

16. The energy efficient power supply device and/or charger (PSD) of claim 14, further comprising at least one energy storage device (ESD) charger, the ESD charger receiving its operating power from the power source mains electrical input or from electrical output of the power converter/supply (PCS).

17. The energy efficient power supply device and/or charger (PSD) of claim 14, wherein the PSD further comprises provisioning to connect to multiple of utilization devices via multiple connectors, connected in a parallel circuit configuration to one another; wherein the PSD may be variably configured for planned utilization differences for the number and type of utilization device requirements anticipated for any given configuration; wherein when any and/or all of the utilization device UD connections are made, the system operates identically to the PSD configured to connect one UD at each then connected UD, excepting that system power output may vary depending on the number and type(s) of UD or UD's connected.

18. The energy efficient power supply device and/or charger (PSD) of claim 14, further comprising illumination device(s), circuit connected to illuminate when electrical power is being produced by the power converter/supply (PCS) and/or when an electrical fault exists with the PSD, viewable from either inside and/or outside the PSD.

19. The energy efficient power supply device and/or charger (PSD) of claim 14, wherein the power converter/supply (PCS) may be of an electrical converter or of an electrical transformer type, and/or may be a type to convert or transform AC power to DC power or DC power to DC power, and/or may be a type with good ride-through, high efficiency, and/or slow discharge characteristics, and/or may use capacitor(s), and/or may be linear type, unregulated type, linear regulated type, switching type, ripple-regulated type, and/or may include circuits that cut back on charging once utilization device(s) is/are fully charged or not using power, and/or may include smoothing, filtering, and/or other desired features.

20. The energy efficient power supply device and/or charger (PSD) of claim 14, wherein the PSD may utilize electro-mechanical, electronic, transistor, and/or integrated circuit components, make-before-break device(s), circuit holding device(s), relay(s), contact(s), silicon controlled rectifier(s), semiconductor-controlled rectifier(s), transistor(s), and/or metal-oxide-semiconductor field-effect transistor(s), or various combinations thereof in the circuitry, however specific functionality may be desired in a finished product.

* * * * *